US011080179B2

(12) United States Patent
Landsborough et al.

(10) Patent No.: US 11,080,179 B2
(45) Date of Patent: Aug. 3, 2021

(54) DEVICE, SYSTEM, AND METHOD FOR AUTOMATICALLY DETECTING AND REPAIRING A BUG IN A COMPUTER PROGRAM USING A GENETIC ALGORITHM

(71) Applicant: Naval Information Warfare Center, Pacific, San Diego, CA (US)

(72) Inventors: Jason A. Landsborough, San Diego, CA (US); Stephen T. Harding, San Diego, CA (US); Bryan T. Beabout, San Diego, CA (US); Emmanuel J. Orozco, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 175 days.

(21) Appl. No.: 16/392,951

(22) Filed: Apr. 24, 2019

(65) Prior Publication Data

US 2020/0341887 A1 Oct. 29, 2020

(51) Int. Cl.
*G06F 11/00* (2006.01)
*G06F 11/36* (2006.01)

(52) U.S. Cl.
CPC ...... *G06F 11/3692* (2013.01); *G06F 11/3684* (2013.01); *G06F 11/3688* (2013.01)

(58) Field of Classification Search
CPC ............. G06F 11/3684; G06F 11/3688; G06F 11/3692; G06N 3/086; G06N 3/126
See application file for complete search history.

(56) References Cited

U.S. PATENT DOCUMENTS

| 5,371,883 | A | 12/1994 | Gross et al. |
| 6,173,440 | B1 | 1/2001 | Darty |
| 6,286,130 | B1 | 9/2001 | Poulsen et al. |
| 7,617,423 | B2 | 11/2009 | Patel et al. |
| 7,640,458 | B2 | 12/2009 | Rao et al. |
| 10,459,695 | B2* | 10/2019 | Hauser ............... G06F 11/3604 |
| 2015/0261657 | A1 | 9/2015 | Kommineni et al. |
| 2018/0100894 | A1 | 4/2018 | Venetsky et al. |
| 2019/0163619 | A1* | 5/2019 | Yoshida ............. G06F 11/3692 |
| 2020/0249929 | A1* | 8/2020 | Saha ........................ G06F 8/36 |

(Continued)

OTHER PUBLICATIONS

Forrest, Stephanie et al., A Genetic Programming Approach to Automated Software Repair, Jul. 2009, ACM (Year: 2009).*

(Continued)

*Primary Examiner* — Marc Duncan
(74) *Attorney, Agent, or Firm* — Naval Information Warfare Center, Pacific; Kyle Eppele; Matthew D Pangallo

(57) ABSTRACT

An initial test variable determined by a fuzz tester to cause a faulty response of an original computer program due to a bug within the original computer program is added to a suite of test variables. Computer program candidates that are functionally equivalent to the original computer program are tested using a suite of test variables including the initial test variable. The computer program candidates are modified and selected using a genetic algorithm based on results of the testing to produce bug-free computer program candidates that are functionally equivalent to the original computer program.

18 Claims, 4 Drawing Sheets

(56) References Cited

U.S. PATENT DOCUMENTS

2020/0356468 A1* 11/2020 Fugate ................ G06F 11/3684

OTHER PUBLICATIONS

Weimer, Westley et al., Automatically Finding Patches Using Genetic Programming, May 2009, IEEE (Year: 2009).*

Le Goues, Claire et al., GenProg: A Generic Method for Automatic Software Repair, 2012, IEEE (Year: 2012).*

Le Goues, Claire, Automatic Program Repair Using Genetic Programming, May 2013, University of Virginia (Year: 2013).*

Le Goues, Claire et al., Representations and Operators for Improving Evolutionary Software Repair, Jul. 2012, ACM (Year: 2012).*

Schulte, Eric et al., Repairing COTS Route Firmware without Access to Source Code or Test Suites: A Case Study in Evolutionary Software Repair, Jul. 2015, ACM (Year: 2015).*

Weimer, Westley et. al., Leveraging Program Equivalence for Adaptive Program Repair: Models and First Results, 2013, IEEE (Year: 2013).*

Le, Xuan-Bach D. et. al., History Driven Program Repair, 2016, IEEE (Year: 2016).*

* cited by examiner

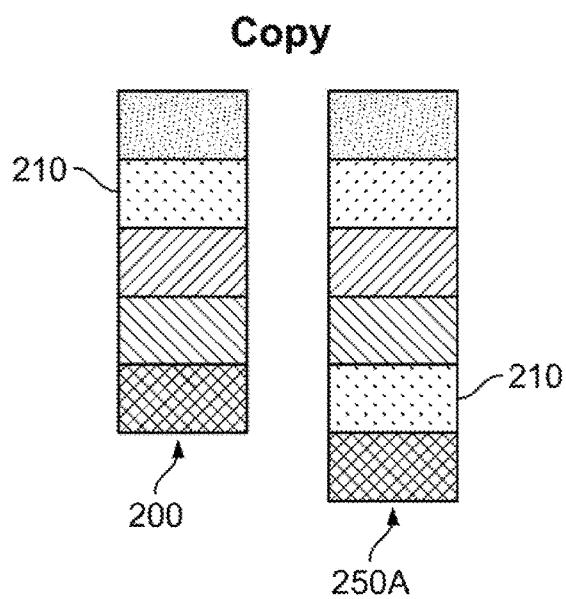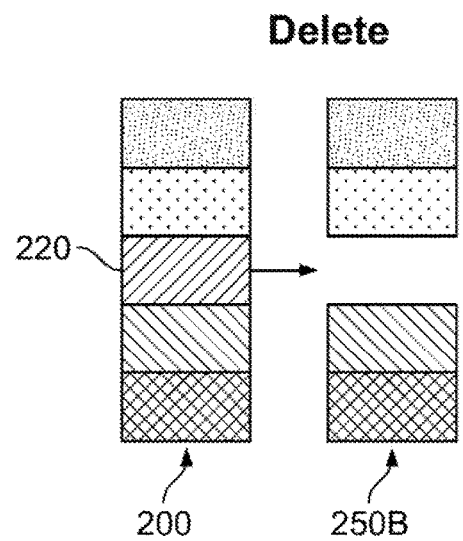
FIG. 2A    FIG. 2B
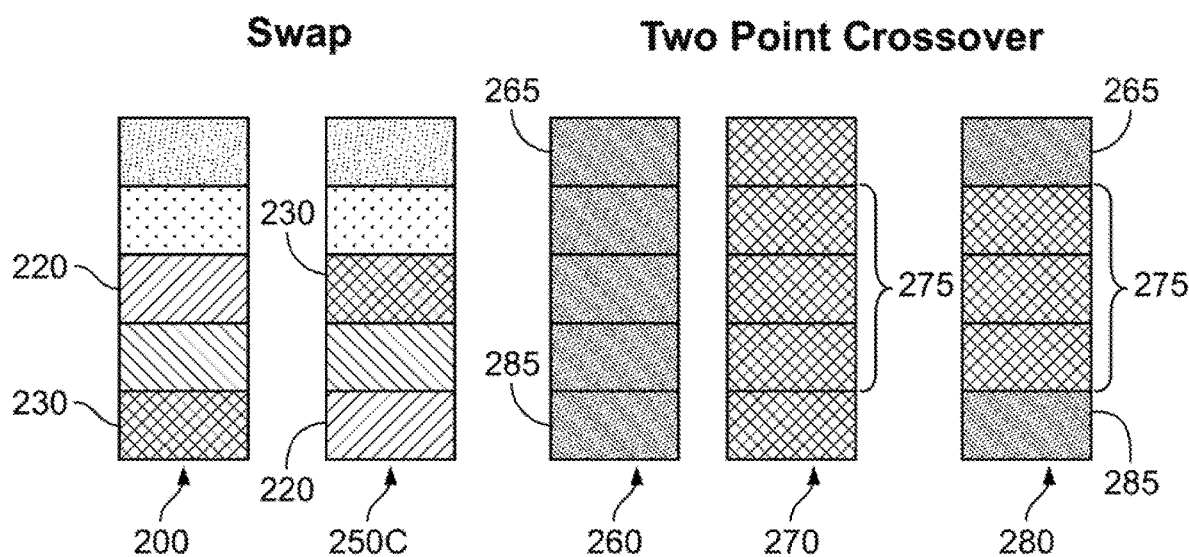
FIG. 2C    FIG. 2D

DEVICE, SYSTEM, AND METHOD FOR AUTOMATICALLY DETECTING AND REPAIRING A BUG IN A COMPUTER PROGRAM USING A GENETIC ALGORITHM

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil, referencing NC 109180.

FIELD OF THE INVENTION

The present invention pertains generally to detecting and repairing a bug in a computer program. More particularly, the present invention pertains to automatically detecting and repairing a bug in a computer program using a genetic algorithm.

BACKGROUND

Software is often released with many bugs unknown to the developers of the software. A software bug is a problem that causes a computer program to provide a faulty response to an input, such as crashing or producing an invalid output. A bug can be an error, a mistake, a defect or a fault in the computer program, which causes failure or deviation from expected results.

Finding and fixing bugs, as part of the maintenance phase of software development, is a very expensive part of the operating budget for a company that develops and maintains software for customers. Also, software bugs are often used in cyber-attacks. A significant amount of time and money is spent to take actions to recover from an attack, such as forensic investigations, cleaning up infections, identity theft protection for customers, regulatory fines, etc. This problem becomes more significant when the original developer no longer maintains a given piece of software, due, e.g., to product end of life or company bankruptcy.

There are various techniques for detecting software bugs, including fuzz testing. A fuzz tester executes a computer program using random or unexpected test variables as inputs. Faulty responses of the computer program, such as hangs or crashes, are detected and reported to a development team. The development team performs additional debugging tests and comes up with patches to repair the computer program.

While advancements in fuzz testers have made them effective in uncovering bugs, there remains a need to automatically repair bugs, without requiring input from a development team.

In view of the above, it would be desirable to have a technique for automatically detecting and repairing bugs in a computer program without requiring user input.

SUMMARY

According to an illustrative embodiment, a fuzz tester determines an initial test variable to supplement a suite of test variables based off the causality of faulty responses on behalf of the original program due to bugs or misconfigurations. Computer program candidates that are functionally equivalent to the original computer program are tested using a suite of test variables including the initial test variable. The computer program candidates are modified and selected using a genetic algorithm based on results of the testing to produce bug-free computer program candidates that are functionally equivalent to the original computer program.

These, as well as other objects, features and benefits will now become clear from a review of the following detailed description, the illustrative embodiments, and the accompanying drawings.

BRIEF DESCRIPTION OF THE DRAWINGS

The novel features of the present disclosure will be best understood from the accompanying drawings, taken in conjunction with the accompanying description, in which similarly-referenced characters refer to similarly-referenced parts, and in which:

FIGS. 2A-2D illustrate examples of modifications made to a computer program candidate using a genetic algorithm according to an illustrative embodiment.

DETAILED DESCRIPTION OF THE EMBODIMENTS

According to illustrative embodiments, a fuzz tester detects a faulty response of an original computer program to an initial test variable, and the initial test variable is added to a suite of test variables for testing computer program candidates that are functionally equivalent to the original computer program. The bug is repaired using a genetic algorithm to modify and select computer program candidates based on responses of the computer program candidates to the suite of test variables. In this way, the bug in the original computer program may be automatically detected and repaired, without requiring action by a development team.

Figure 1:
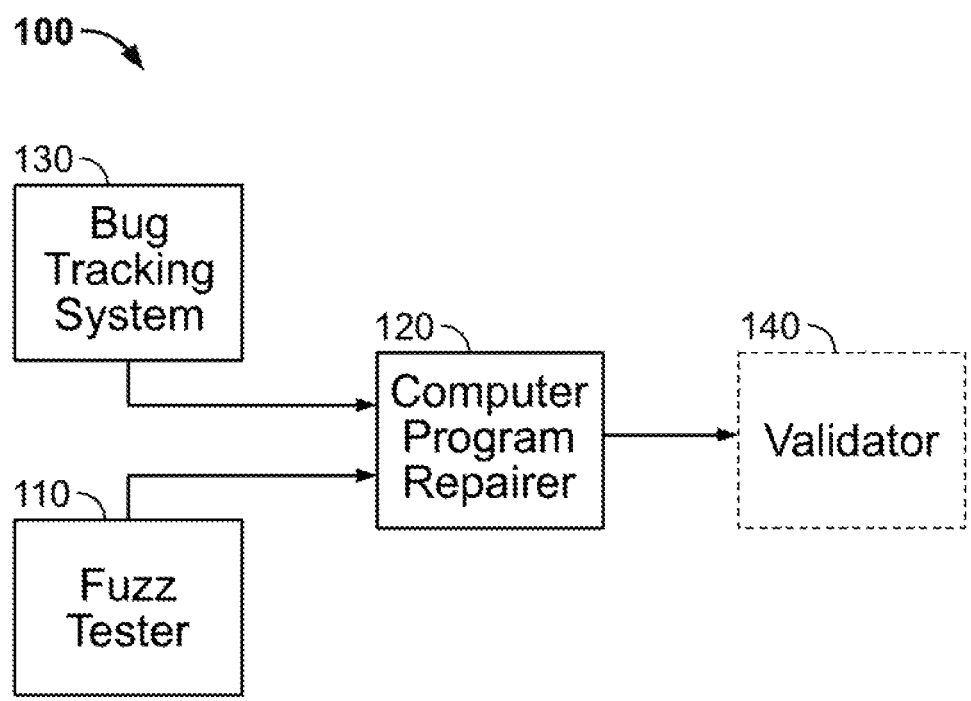
FIG. 1 illustrates a system for detecting and repairing a bug in a computer program using a genetic algorithm according to an illustrative embodiment.

FIG. 1 illustrates a system for detecting and repairing a bug in a computer program according to an illustrative embodiment. Referring to FIG. 1, the system 100 includes a fuzz tester 110. The fuzz tester 110 is seeded with one or more initial test variables and tests the response of an original computer program to the initial test variables.

The fuzz tester 110 may be implemented with any of the various types of fuzz testers. In one illustrative embodiment, the fuzz tester 110 may be a blackbox fuzz tester. A blackbox fuzz tester repeatedly generates random initial test variables and observes the response of the computer program to detect faulty responses.

In another illustrative embodiment, the fuzz tester 110 may be a whitebox fuzz tester. A whitebox fuzz tester has full knowledge of the computer program structure and can guide the generation of test variable inputs based on symbolic execution. A drawback of a whitebox fuzz tester is that security researchers often do not have access to the source code for the computer program they are testing.

According to another illustrative embodiment, the fuzz tester 110 may be a greybox fuzz tester. The greybox fuzz tester is a middle ground between a blackbox fuzz tester and a whitebox fuzz tester. A greybox fuzz tester does not assume knowledge of the computer program through source code or sophisticated program analysis. Instead, the greybox fuzz tester uses instrumented feedback, such as code coverage. Evolutionary greybox fuzz testers utilize a genetic algorithm to mutate and optimize initial test variable inputs.

The fuzz tester 110 is configured to detect a faulty response of an original computer program to at least one initial test variable due to a bug. This is performed by executing the original computer program using one or more initial test variables and determining whether the response of the original computer program is the expected response. The fuzz tester 110 may continue to execute the original computer program using different initial test variables as inputs until a faulty response is detected.

Once a faulty response is detected by the fuzz tester 110, the initial test variable that resulted in the faulty response is provided to a computer program repairer. 120. The computer program repairer 120 adds the initial test variable from the fuzz tester 110 to a suite of test variables stored, for example, in the computer program repairer 120.

Additional test variables that result in a faulty response of the original computer program may be provided from a user via, for example, a bug tracking system 130. The computer program repairer 120 may add these additional test variables to the suite of test variables.

The computer program repairer 120 may be populated in advance with an initial set of computer program candidates that are functionally equivalent to the original program. This set of computer program candidates may be generated by a development team.

The computer program repairer 120 is configured to test the computer program candidates that are functionally equivalent to the original computer program using the suite of test variables, including the initial test variable from the fuzz tester 110 and any additional test variables received via the GUI 130. The computer program repairer 120 tests the computer program candidates by executing the computer program candidates using the suite of test variables.

The computer program repairer 120 is further configured to modify and select the computer program candidates based on results of testing using a genetic algorithm to produce bug-free computer program candidates that are functionally equivalent to the original computer program. As the computer program repairer 120 modifies and selects the computer program candidates, the set of computer program candidates evolves.

As an aid to understanding how the set of computer program candidates evolves, an explanation of a genetic algorithm is provided. A genetic algorithm is a biologically inspired algorithm that uses mutation and selection for optimization. A genetic algorithm is applied to a population of candidates which are mutated and combined to create new candidates within the population. The population is maintained through selection. In the present case, the candidates are computer programs that are functionally equivalent. Multiple methods of selection are available. According to an illustrative example, tournament selection is used. Tournament selection involves comparing fitness scores of multiple candidates and selecting the candidates with the most favorable fitness scores to continue to evolve. The candidate with the worst fitness is rejected from the population.

Fitness scores are determined using a fitness function. In the case of evolving computer program candidates to repair a bug, the fitness function includes testing the computer program candidates using a suite of test variables. Computer program candidates which fail, i.e., computer program candidates which produce faulty responses to input test variables, are assigned a bad fitness score. Computer program candidates which pass, i.e., candidate computer programs which do not produce a faulty response to the input test variables, are given assigned fitness scores which are measured by a desired optimization or specialization criteria, such as: program size, program performance, program energy usage, or program diversity.

According to illustrative embodiments, the computer program repairer 120 assigns fitness scores to the computer program candidates based on results of the testing and selects the computer program candidates based on the assigned fitness scores.

The computer program repairer 120 modifies the computer program candidates based on results of the testing by replacing source code within the computer program candidates. If the source code to repair the bug somewhere within executable portions of the functionally equivalent computer program candidates, the computer program candidates can be repaired using existing source code. This may be understood with reference to FIGS. 2A-2D.

FIGS. 2A-2D illustrate examples of modifications made to a computer program candidate using a genetic algorithm according to an illustrative embodiment. Referring first to FIG. 2A, one modification involves copying and inserting portions of a computer program candidate. As shown in FIG. 2A, a portion 210 of a computer program candidate 200 may be copied and inserted, e.g., at the end of the computer program candidate 200, resulting in a modified computer program candidate 250A.

Referring to FIG. 2B, another modification involves deleting a portion of a computer program candidate. As shown in FIG. 2B, a portion 220 of a computer program candidate 200 may be deleted, resulting in a modified computer program candidate 250B.

Referring to FIG. 2C, another modification involves swapping portions of a computer program candidate. That is, portions 220 and 230 of a computer program candidate 200 may be swapped, resulting in a modified computer program candidate 250C.

Referring to FIG. 2D, another modification involves creating a new computer program candidate using a crossover combination technique. That is, one or more crossover points in two computer program candidates may be selected, and the portions of the computer program candidates at those points may be swapped to produce a modified computer program candidate. For example, as shown in FIG. 2D, a modified computer program candidate 280 contains a portion 265 from the start of a first computer program candidate 260 to a first offset point, a portion 275 of a second computer program candidate 270 from the first offset point to a second offset point, and a portion 285 of the first computer program candidate 260 from the second offset point to the end.

Referring again to FIG. 1, the computer program repairer 120 modifies the computer program candidates that produce a faulty response to a test variable (using modifications such as those shown in FIGS. 2A-2D) in an effort to patch the bug in the original computer program. The computer program repairer 120 assigns favorable fitness scores to the computer program candidates that pass testing. These computer program candidates may be output as a repaired computer program. Those computer program candidates that do not pass testing may be expunged.

Ideally, the suite of test variables that the initial test variables from the fuzz tester 110 are added to will cover the necessary functionality that needs to be tested. This will provide a high assurance that the application of the genetic algorithm produces modified computer program candidates which are functionally equivalent to the original computer program (with the exception of the bug in the original program being fixed). When this is not the case, according to one example, the fuzz tester 110 can be leveraged to generate a larger number of test variables to increase code coverage, i.e., the percentage of executable code which is executed for one or more runs or tests. Starting with different test variables as the initial test variables will often result in different execution paths being explored, which can be combined to further increase test suite coverage.

Another way to increase code coverage is to use additional tests to provide assurance that modified computer program candidates are truly functionally equivalent programs, with the bug(s) fixed. These additional tests can be used online as part of applying the genetic algorithm. As an alternative, these additional tests can be used offline after candidate computer programs are generated, e.g., if these generated tests significantly increase testing time.

The computer program repairer 120 repeatedly tests, modifies, and selects the computer program candidates until at least one termination criteria is met. These termination criteria include a time threshold, a threshold number of modifications, and an end of the suite of test variables. If the time threshold or the threshold number of modifications is met before the computer program repairer 120 tests the computer program candidates using all the test variables in the suite, the computer program candidates may be output to an optional validator 140 (indicated as being optional by the dashed lines in FIG. 1) to test the computer program candidates using the remaining test variables in the test suite.

The computer program candidates output by the computer program repairer 120 may be output for the standard quality assurance testing process. As an alternative, a team of security professionals can generate attacks for the bugs to test on the original computer program, along with the computer program candidates output by the computer program repairer 120. Results of this testing may be included in a quality assurance report.

Figure 3:
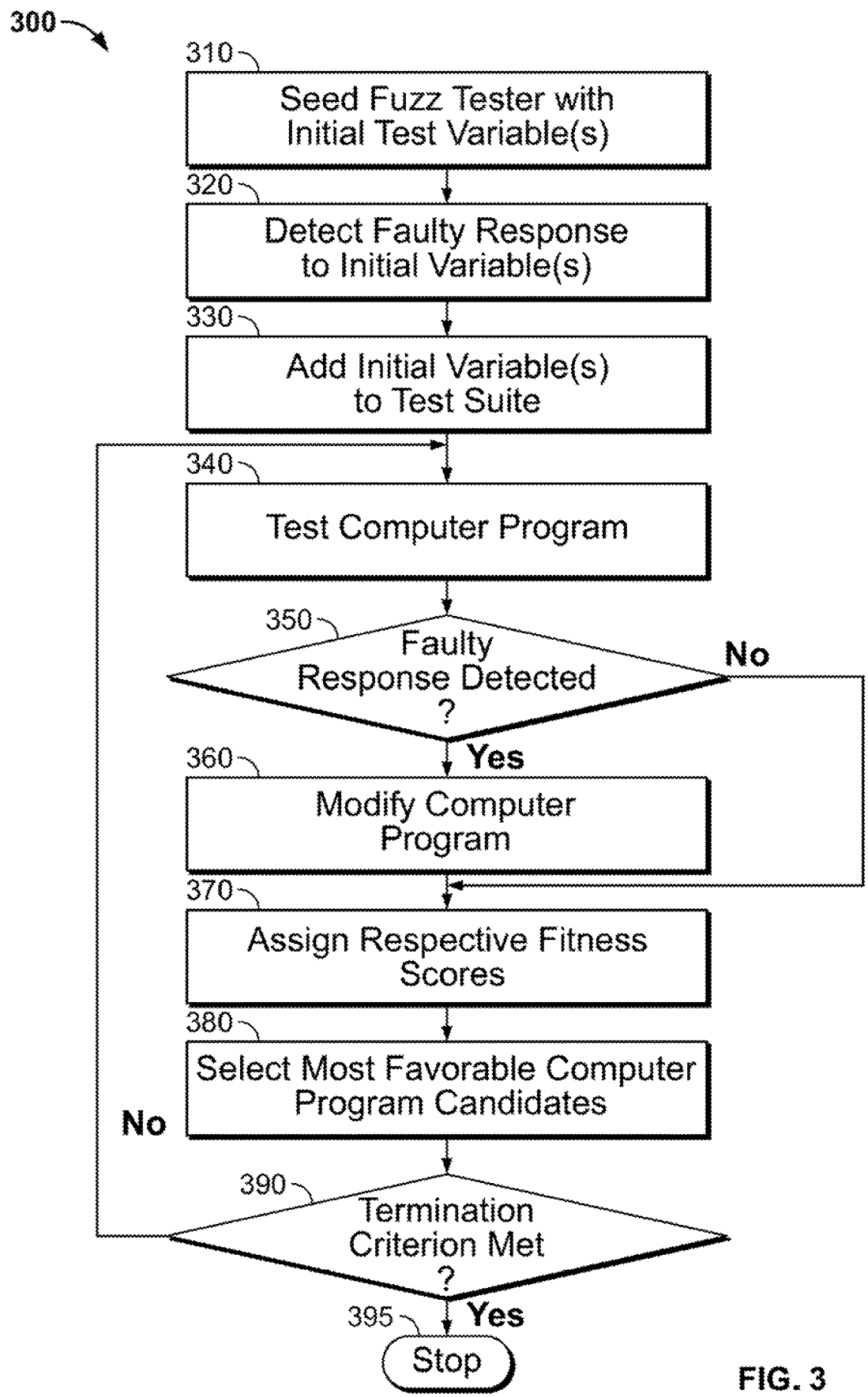
FIG. 3 is a flow chart depicting a process for detecting and repairing a bug in a computer program according to an illustrative embodiment.

FIG. 3 is a flow chart showing steps of a process for detecting and repairing a bug in an original computer program according to an illustrative embodiment. Referring to FIG. 3, the process 300 begins at step 310 at which a fuzz tester, such as the fuzz tester 110 shown in FIG. 1, is seeded with at least one initial test variable. At step 320, the fuzz tester detects a faulty response of an original computer program to at least one initial test variable. At step 330, the initial test variable that caused the faulty response of the original computer program is added to a suite of test variables used by a computer program repairer, such as the computer program repairer 120 shown in FIG. 1.

At step 340, computer program candidates that are functionally equivalent to the original computer program are tested using a test variable from the suite of test variables. The computer program candidates are tested by executing the computer program candidates using the test variable as an input and detecting responses of the computer program candidates to the test variable.

At step 350, the computer program repairer determines whether a faulty response to the test variable is detected. If a faulty response is detected, the computer program repairer modifies the computer program candidate(s) that produced the faulty response at step 360. Modifications may include, for examples, copying, deleting, swapping, or crossover.

At step 370, the computer program repairer assigns each of the computer program candidates a respective fitness score based on results of the testing. At step 370, the computer program repairer selects most favorable computer program candidates based on the respective fitness score assigned to each of the computer program candidates. Computer program candidates with the best fitness scores are retained, and one or more computer program candidates with the worst fitness scores are expunged.

At step 370, a determination is made whether a termination criterion is met. The termination criterion may include a time threshold, a number of modifications threshold, or an end of test variables in the test suite. If the termination criterion is not met, the process returns to step 340, and the computer program candidates are repeatedly tested using another test variable from the test suite and modified as necessary until a termination criterion is met. When the termination criterion is met, the process stops at step 395.

It should be appreciated that the fewer, additional, or alternative steps may also be involved in the process and/or some steps may occur in a different order. For example, although not shown, it should be appreciated that if test variables remain in the test suite after step 390, the computer program candidates may be validated by testing the computer program candidates using the remaining test variables in the test suite, and the computer program candidates may be modified if any faulty response is detected to the remaining test variables.

Figure 4:
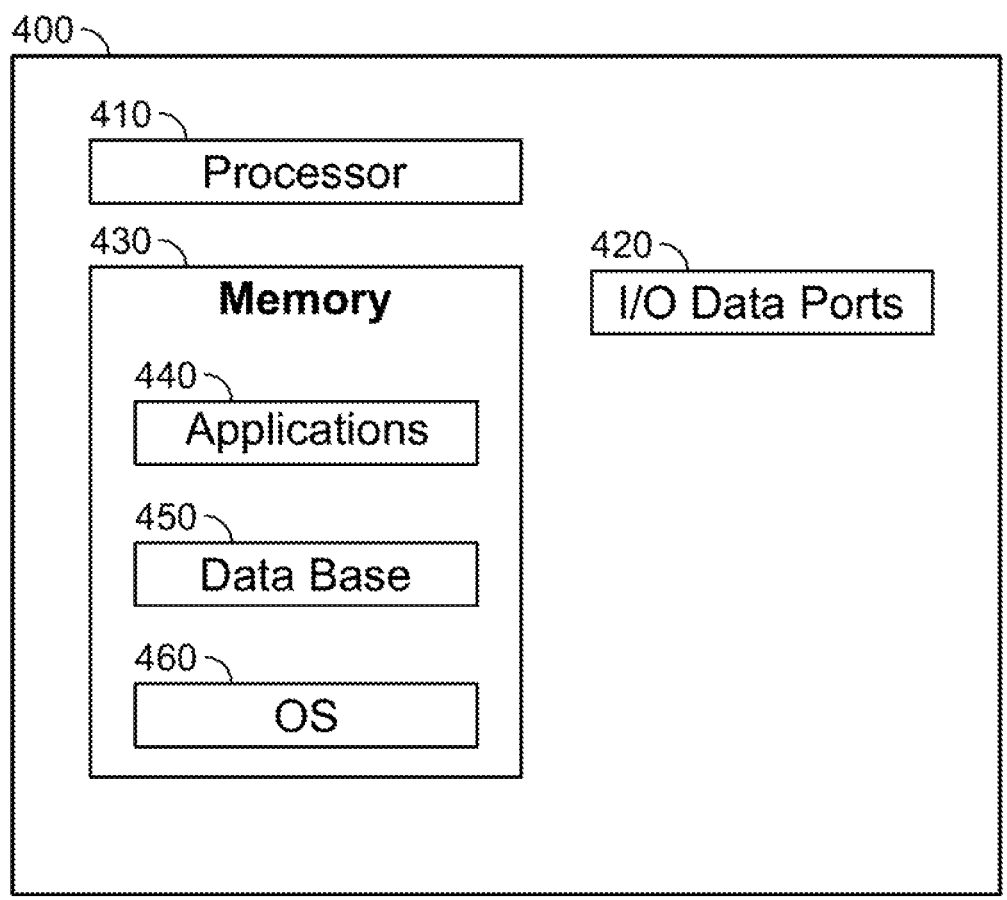
FIG. 4 is a block diagram of a computing device with which various components of the system shown in FIG. 4 may be implemented according to an illustrative embodiment.

FIG. 4 is a block diagram of a computing device 400 with which various components of the computer program repairer 420 may be implemented according to an illustrative embodiment. The fuzz tester 110 and the validator 140 may be implemented with a similar computing device. Although no connections are shown between the components illustrated in FIG. 4, those skilled in the art will appreciate that the components can interact with each other via any suitable connection to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, includes non-transitory storage media. Storage media can include volatile and/or non-volatile, removable and/or non-removable media, such as, for example; RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 4, the computing device 400 includes a processor 410 that receives inputs and transmits outputs via input/output (I/O) Data Ports 420. The I/O Data Ports 420 can be implemented with, e.g., any suitable interface through which data may be received and transmitted wired and/or wirelessly. For example, in the case of the computing device 400 used in the computer program repairer 120 shown in FIG. 1, the inputs may include test variables that resulted in faulty responses from the fuzz tester 110 and additional test variables received via the GUI 130.

Although not shown, the computing device 400 may also include a physical hard drive. The processor 410 communicates with the memory 430 and the hard drive via, e.g., an address/data bus (not shown). The processor 410 can be any commercially available or custom microprocessor. The memory 430 is representative of the overall hierarchy of memory devices containing the software and data used to implement the functionality of the computing device 400. The memory 430 can include, but is not limited to, the types of memory devices described above. As shown in FIG. 4, the memory 430 may include several categories of software and data used in the computing device 400, including applications 440, a database 450, an operating system (OS) 460, etc.

The applications 440 can be stored in the memory 430 and/or in a firmware (not shown) as executable instructions and can be executed by the processor 410. The applications 440 include various programs that implement the various features of the computing device 400. For example, in the case of the computer program repairer 120 shown in FIG. 1, the applications 440 may implement the functions of the computer program repairer, including testing computer program candidates using a suite of test variables and modifying and selecting the computer program candidates based on the results of testing, to produce bug-free computer program candidates that are functionally equivalent to the original computer program, etc.

The database 450 represents the static and dynamic data used by the applications 440, the operating system (OS) 460, and other software programs that may reside in the memory. The database 450 may be used to store various data including data needed to execute the applications 440. For example, in the case of the computer program repairer 120 shown in FIG. 1, the database 50 may store, e.g., a suite of test variables, additional test variables from the fuzz tester 110 and/or the GUI 130, computer program candidates that are initially populated, and computer program candidates that evolve through application of a genetic algorithm.

While the memory 430 is illustrated as residing proximate to the processor 410, it should be understood that at least a portion of the memory 430 can be a remotely accessed storage system, for example, a server on a communication network, a remote hard disk drive, a removable storage medium, combinations thereof, and the like.

It should be understood that FIG. 4 and the description above are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer readable instructions.

Furthermore, although FIG. 4 shows an example of how a computing device 400 with components of the computer program repairer 120 may be implemented, those skilled in the art will appreciate that there may be other computer system configurations, including; multiprocessors, parallel processors, virtual processors, distributed computing systems, microprocessors, mainframe computers, and the like.

According to illustrative embodiments, a genetic algorithm is applied to modify computer program candidates by replacing code to repair a bug. In one embodiment, the code may be binary code. However, it should be appreciated that the principles described above may apply to other type of source code in higher level languages including (but not limited to): C, C++, Java, and Python. Modifications will work similarly in these cases on the Abstract Syntax Tree (AST) node level as opposed to the instruction level. In addition, modifications may be applied at the assembly code level in almost exactly the same manner as in binary code modification.

In addition, as noted above, in addition to receiving initial test variables from a fuzz tester, initial test variables may be received from users via a bug tracking system. These test variables may be based on bug reports from users (provided either automatically through exceptions or through bug report forms), attacks on bugs released in the wild, or known vulnerabilities such as those from the Common Vulnerabilities and Exposures (CVE) database maintained by MITRE and the Department of Homeland Security. In some cases, test variables based on these sources will need some modification before they can be used as part of an automated test suite.

According to illustrative embodiments, there are many advantages to using a genetic algorithm to repair a bug in a computer program. One advantage is that computer programs may be repaired in a cost-effective manner, without the need for development team resources to repair the bug. Functionally equivalent bug-free computer program candidates can be generated before an official software release. Also, the principles described above can be used to generate patched computer program candidates to repair legacy computer programs. This is especially beneficial for repairing computer programs that are no longer being maintained by a vendor.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A computing device, comprising:
a processor; and
a memory having instructions stored thereon which, executed by the processor, cause the processor to perform:
testing a response of an original computer program using a fuzz tester with initial test variables until a faulty response is detected;
providing the initial test variable determined by the fuzz tester to cause the faulty response of the original computer program due to a bug within the original computer program to a computer program repairer;
testing computer program candidates that are separate and functionally equivalent to the original computer program with the computer repairer using a suite of test variables including the initial test variables; and
modifying and selecting the computer program candidates using a genetic algorithm based on results of the testing to produce bug-free computer program candidates that are functionally equivalent to the original computer program.

2. The computing device of claim 1, wherein testing the computer program candidates includes executing the computer program candidates using the suite of test variables as inputs and detecting responses of the computer program candidates to the suite of test variables.

3. The computing device of claim 2, wherein the instructions cause the processor to modify computer program candidates that produce faulty responses to a test variable.

4. The computing device of claim 3, wherein the computer program candidates are repeatedly tested, modified, and selected until a termination criterion is met.

5. The computing device of claim 4, wherein the termination criterion includes at least one of a time limit and a threshold number of modifications.

6. The computing device of claim 4, wherein the termination criterion includes an end of test variables in the test suite.

7. The computing device of claim 1, wherein the instructions further cause the processor to:

assign each of the computer program candidates a respective fitness score based on the testing, wherein the computer program candidates are selected based on the respective fitness score assigned to each of the computer program candidates.

8. The computing device of claim 1, wherein the instructions further cause the processor to:

modify the computer program candidates by performing at least one of copying and inserting a portion of the computer program candidate, deleting a portion of the computer candidate, swapping portions of the computer program candidate, and creating new program candidates using portions of the computer program candidates.

9. The computing device of claim 1, wherein the suite of test variables are stored in the memory, provided by a user using a bug tracking system, or a combination thereof.

10. The method of claim 1, further including:

assigning each of the computer program candidates a respective fitness score based on the testing, wherein the computer program candidates are selected based on the respective fitness score assigned to each of the computer program candidates.

11. The device of claim 1, wherein the fuzz tester consists of a whitebox fuzz tester or a greybox fuzz tester.

12. A method for repairing a computer program, comprising:

testing a response of an original computer program using a fuzz tester with initial test variables until a faulty response is detected;

providing the initial test variable determined by the fuzz tester to cause the faulty response of the original computer program due to a bug within the original computer program to a computer program repairer;

testing computer program candidates that are separate and functionally equivalent to the original computer program with the computer program repairer using a suite of test variables including the initial test variables; and modifying and selecting the computer program candidates using a genetic algorithm based on results of the testing to produce bug-free computer program candidates that are functionally equivalent to the original computer program.

13. The method of claim 12, wherein testing the computer program candidates includes executing the computer program candidates using the suite of test variables as inputs and detecting responses of the computer program candidates to the suite of test variables.

14. The method of claim 13, wherein computer program candidates that produce faulty responses to a test variable are modified using the genetic algorithm.

15. The method of claim 14, wherein the computer program candidates are repeatedly tested, modified, and selected until a termination criterion is met.

16. The method of claim 15, wherein the termination criterion includes at least one of a time limit and a threshold number of modifications.

17. The method of claim 15, wherein the termination criterion includes an end of test variables in the test suite.

18. The method of claim 12, wherein the fuzz tester consists of a whitebox fuzz tester or a greybox fuzz tester.

* * * * *